Oct. 27, 1953
W. T. GRAHAM
2,656,778
OVERRIDING SHANK FOR RESILIENT SHANK PLOWS
Filed Dec. 24, 1949
2 Sheets-Sheet 1
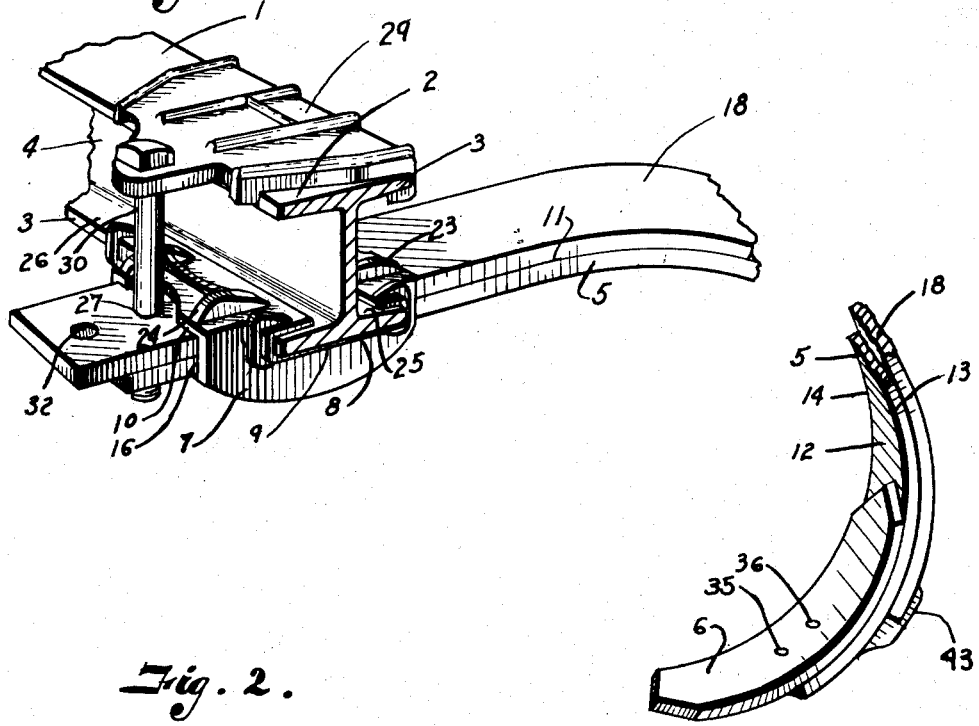
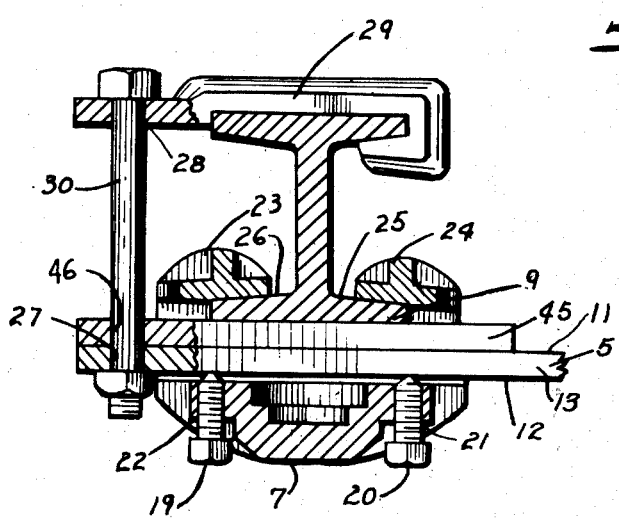
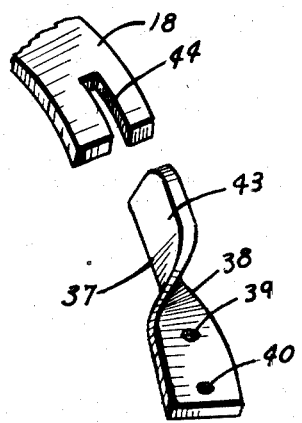
Inventor
William T. Graham
By Fishburn & Mullendore
Attorneys Oct. 27, 1953
W. T. GRAHAM
2,656,778
OVERRIDING SHANK FOR RESILIENT SHANK PLOWS
Filed Dec. 24, 1949
2 Sheets-Sheet 2
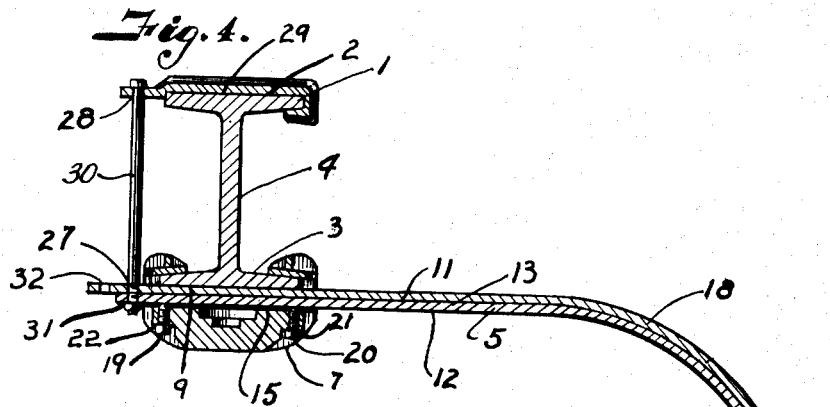
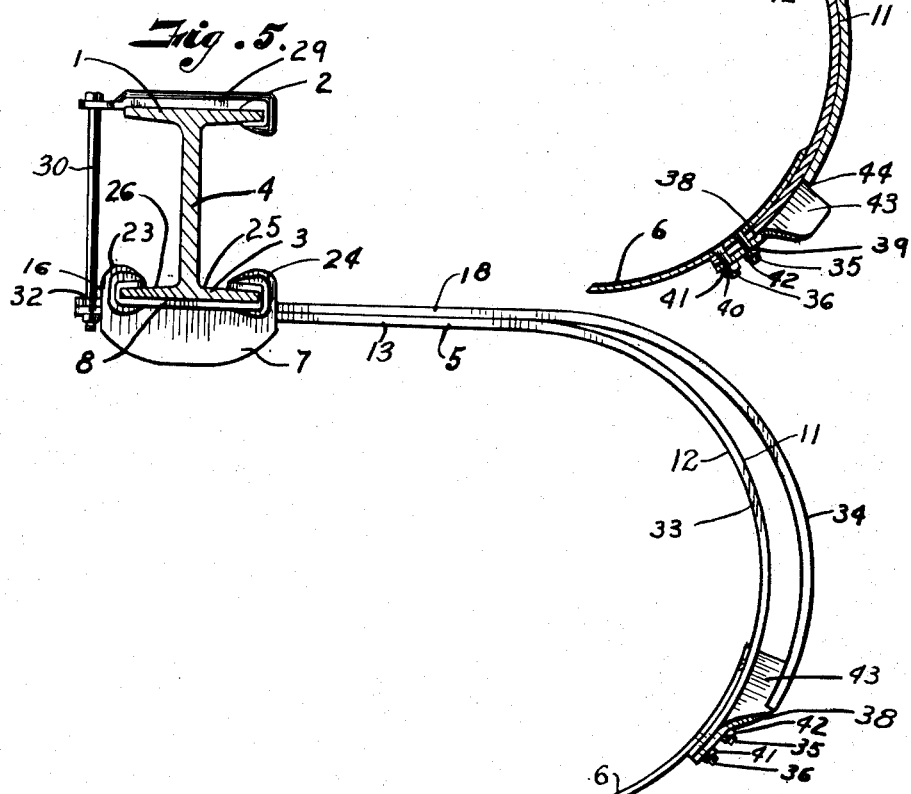
Inventor
William T. Graham
By Fishburn & Mullendore
Attorneys Patented Oct. 27, 1953

2,656,778

UNITED STATES PATENT OFFICE 2,656,778

OVERRIDING SHANK FOR RESILIENT SHANK PLOWS

William T. Graham, Amarillo, Tex.

Application December 24, 1949, Serial No. 135,010

2 Claims. (Cl. 97—198.1)

1

This invention relates to plows of the type disclosed in the Noell et al. Patent No. 2,029,249, issued January 28, 1936, and which include a wheel supported frame carrying a plurality of ground working tools which are mounted on resilient shanks. The shanks extend rearwardly and curve downwardly and forwardly to carry the ground working tools in a position for forming alternate ridges and furrows when the plow is in use. When such plows are operated in fields having a substantial amount of stubble and other debris, such debris tends to roll up in front of the shanks and interfere with the plowing operation. It has been found that this difficulty may be avoided by carrying the plowing frame at a higher elevation and provide longer shanks to give more space under the plow frame; however, when the plow with the longer shanks operates in hard ground or in fields having stones, roots or other obstructions, the shanks may not have sufficient rigidity and it is, therefore, the purpose of the present invention to provide the plow shanks with an overriding shank adapted to be anchored to the frame by a common clamp and to bear upon and stiffen the plow shanks.

Other objects of the invention are to provide an overriding shank that is adjustable relatively to the plow shank to control the vibratory action thereof, and to provide an overriding shank that is easily and quickly applied and which may be readily removed when not desired.

In accomplishing these and other objects of the invention as hereinafter pointed out, I have provided improved structure, the preferred form of which is illustrated in the accompanying drawings wherein:

Fig. 1 is a sectional perspective view of a portion of a plow frame to which the shank of a ground working tool is attached and illustrating application of an override shank constructed and applied in accordance with the present invention.

Fig. 2 is a section through the clamp and forward end of the shank carrying the ground working tool, particularly illustrating an insert which is applied in the clamp when the overriding shank is removed.

Fig. 3 is a perspective view of the lower end of the override shank and the clip for effecting a connection thereof with the tool carrying portion of the primary shank.

Fig. 4 is a longitudinal section through the frame member, shank attaching clamp, the shank of the ground working tool, and the overriding shank particularly illustrating anchorage of the overriding shank and connection thereof with the

2 portion of the shank carrying the ground working tool.

Fig. 5 is a side elevational view showing the overriding shank adjusted relatively to the shank of the ground working tool to change the action effected on the shank of the ground working tool.

Referring more in detail to the drawings:

1 designates a tool supporting part of a plow frame which may be a transversely extending I beam arranged with the flanges 2 and 3 extending substantially horizontal, and the web 4 in vertical position for attaching primary shanks 5 of a ground working tool 6 by means of a clamp 7. The clamp 7 preferably follows the structure disclosed in my copending application on "Beam Clamp," Serial No. 789,952, filed December 5, 1947 (issued as Patent No. 2,595,352, May 6, 1952).

The clamp 7 includes a main body part 8 of sufficient length to extend across the flat bottom face 9 of the lower flange 3 of the I beam and of a width to accommodate a substantially rectangular passageway 10 for receiving the shank 5. The shank 5 has substantially flat upper and lower faces 11 and 12 and parallel side edges 13 and 14 to correspond with a lower face 15 of the passageway that extends transversely across the I beam in spaced relation with the lower face 9, and side face 16 which engages the side edges 13 and 14 of the shank, as shown in Figs. 1 and 2. The passageway, however, is of greater depth than the thickness of the shank 5 to accommodate an overriding shank 18, as later described, and which is adapted for support in clamping contact with the lower face 9 of the I beam by set screws 19 and 20, which are threaded in openings 21 and 22 in the body part 8 of the clamp. The clamp also includes flanges 23 and 24 that bridge the passageway 10 and overlap the upper faces 25 and 26 of the I beam flange 9. Therefore, when the set screws are tightened, the flanges are drawn downwardly into contact with the flange 3 of the I beam and the shanks 5 and 18 are moved into clamping contact with each other and the overriding shank in clamping contact with the lower face 9 of the I beam. The overriding shank 18 is preferably of the same width and thickness as the shank 5 and conforms in curvature with the shank to stiffen shank 5 and provide a snubbing action thereof when the plow is in use. The forward end of the shank 5 extends through the body part of the clamp a sufficient distance to accommodate an opening 31 therein which cooperates with an opening 28 in an upper clamp part 29 that is hooked over the upper flange of the I beam and connected with the shank 5 by a fastening device such as bolt 30 extending through the respective openings 27 and 28. The forward end of the overriding shank also has an opening 27 for passing the bolt 30 therethrough and is of longer length than the shank 5 to accommodate an additional opening 32 whereby the overriding shank may be shifted retractively to space the downwardly curving portion 34 thereof away from the curving portion 33 of the shank 5 so as to reduce the extent of contact between the shanks, and limit the snubbing action of the override shank, as shown in Fig. 5, while maintaining the desired rigidity in the portion of the shank 5 engaged by the clamp 7. In order that the lower curved end of the override shank may be connected with a portion of the shank carrying the ground working tool 6 and to prevent lateral movement thereon, the fastening devices 35 and 36 which secure the ground working tool also secure a clip 37 having a plate portion 38 provided with openings 39 and 40 to pass the fastening devices 35 and 36 and permit mounting of the nuts 41 and 42 on the exterior side of the clip plate, as shown in Figs. 3 and 4. The clip terminates in a wing 43 which may be formed as an integral part by providing the plate portion with a 90° twist so that it extends rearwardly from the shank 5 to engage in a slot 44 provided in the terminal end of the overriding shank.

It is thus obvious that the overriding shank is retained from lateral movement with respect to the shank 5 while allowing relative movement between the shanks under action of the ground working tool when the plow is in use.

When the plow is used in relatively loose soils and the overriding shank 18 is not necessary, it may be readily removed by loosening the set screws 19 and 20 and removing the bolt 30. The overriding shank 18 may then be withdrawn from the passageway 10 of the clamp part 8 and the space that was occupied thereby is filled by a plate 45 having the thickness and width of the override shank and which is provided with an opening 46 at the forward end to pass the bolt 30, as shown in Fig. 2. The set screws are then retightened to clamp the shank 5.

From the foregoing, it is obvious that I have provided an override shank for plows of the character described, which is quickly and easily applied to strengthen and limit pumping or vibratory action of the shanks carrying the ground working tools when such plows are used in hard or rocky soils. It is also obvious that the overriding shank may be adjusted relative to the main shank so as to reduce the snubbing action and allow greater freedom of movement of the tool carrying shank when operating the plow in loose soil, or if desired, the overriding shank may be entirely removed and replaced by the insert or filler plate 45.

What I claim and desire to secure by Letters Patent is:

1. In a plow including a frame, a resilient shank having a rearwardly and downwardly curved portion extending from the frame, an overriding shank conforming to the shape of the resilient shank and superimposed thereon to control resilience of said resilient shank and having a slotted end, a ground working tool carried by the curved portion of the resilient shank, fastening devices securing the ground working tool to the resilient shank, a clip fixed to the resilient shank by said fastening devices and having a wing portion engaging in said slot of the overriding shank, and means for anchoring the shanks to said frame.

2. In a plow including a frame, a clamp on the frame, a resilient shank having a forward end carried by the clamp and having an opening therethrough, said shank having a downwardly curved portion extending rearwardly from the clamp, an overriding shank conforming to the shape of the resilient shank and superimposed thereon to control resilience of said resilient shank and having a forward end carried by the clamp and provided with a series of openings any one of which is adapted to register with an opening of the resilient shank, a fastening device extending through the registered openings, said overriding shank having a slotted rear end, a ground-working tool carried by the downwardly curved portion of the resilient shank, and a clip having a rearwardly directed wing portion of a width to maintain engagement with the overriding shank in the adjusted positions of said shanks, said clip being fixed to the resilient shank and having a portion extending rearwardly of the ground-working tool and engaging in said slotted rear end of the overriding shank.

WILLIAM T. GRAHAM.

References Cited in the file of this patent

UNITED STATES PATENTS

| Number | Name | Date |
|---|---|---|
| 31,517 | McMinn | Feb. 10, 1861 |
| 748,466 | Bateman | Dec. 29, 1903 |
| 811,517 | McCune | Jan. 30, 1906 |
| 811,753 | Ulsh | Feb. 6, 1906 |
| 1,013,710 | Widder | Jan. 2, 1912 |
| 1,358,742 | Hollmann | Nov. 16, 1920 |
| 1,709,536 | Morris | Apr. 16, 1929 |
| 1,838,355 | Benjamin | Dec. 29, 1931 |
| 2,029,249 | Noell et al. | Jan. 28, 1936 |
| 2,257,650 | Pfeifer et al. | Sept. 30, 1941 |
| 2,355,519 | Dunham | Aug. 8, 1944 |
| 2,462,641 | Hyland | Feb. 22, 1949 |
| 2,595,352 | Graham | May 6, 1952 |

FOREIGN PATENTS

| Number | Country | Date |
|---|---|---|
| 14,148 | Australia | June 29, 1928 |
| 110,989 | Australia | July 4, 1940 |